Nov. 24, 1970  A. L. BUNTING  3,541,645
AUTOMATIC ROTARY PLASTIC MOLDING MACHINE
Filed Oct. 30, 1967  3 Sheets-Sheet 1
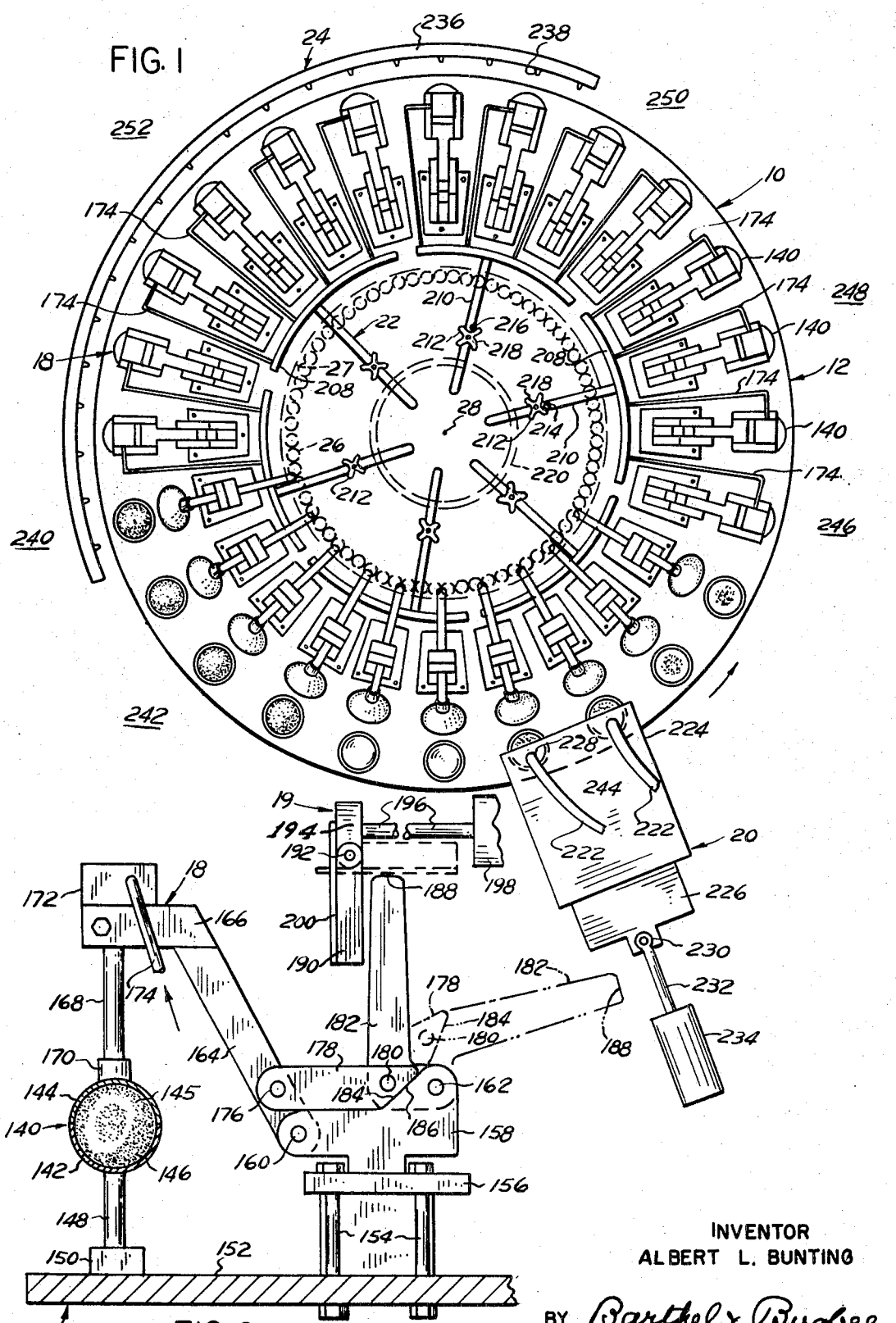
INVENTOR
ALBERT L. BUNTING
BY Barthel & Bugbee
ATTORNEYS

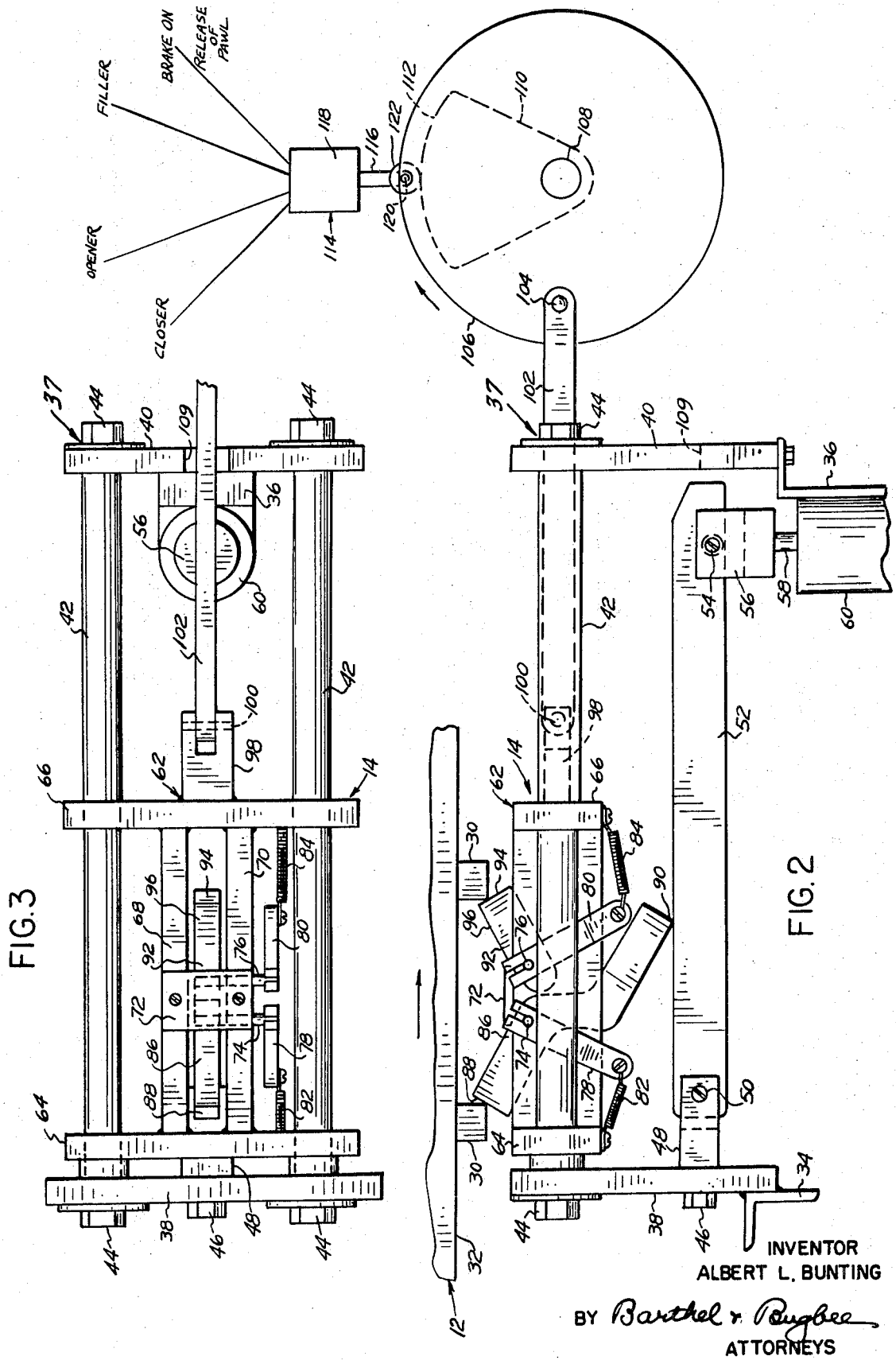

Nov. 24, 1970   A. L. BUNTING   3,541,645
AUTOMATIC ROTARY PLASTIC MOLDING MACHINE
Filed Oct. 30, 1967   3 Sheets-Sheet 3
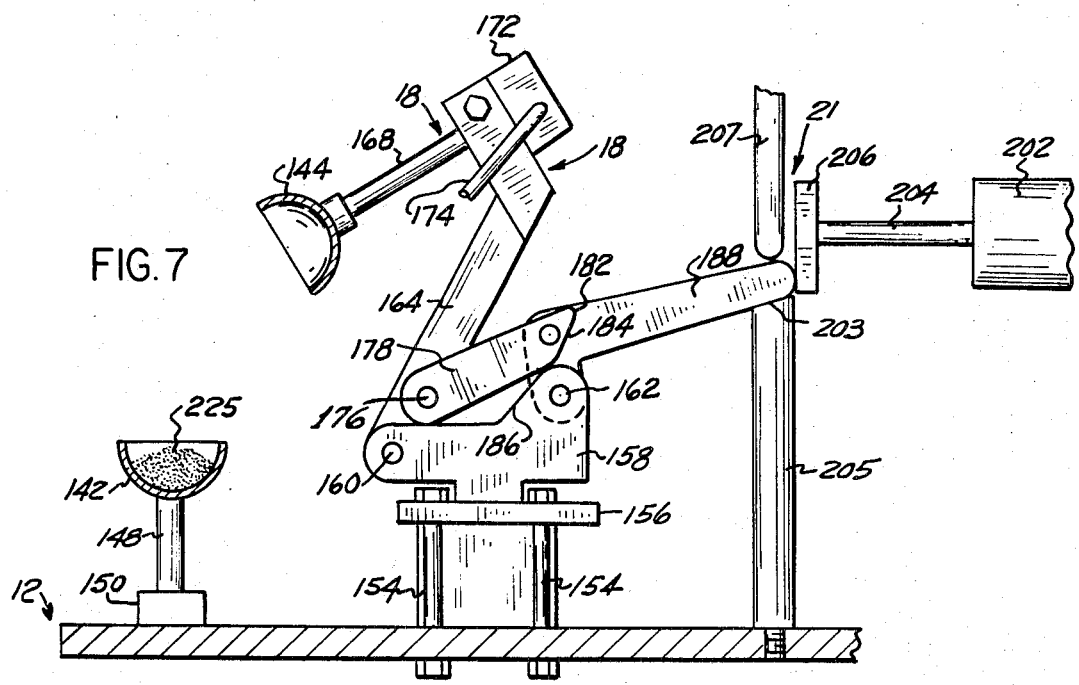
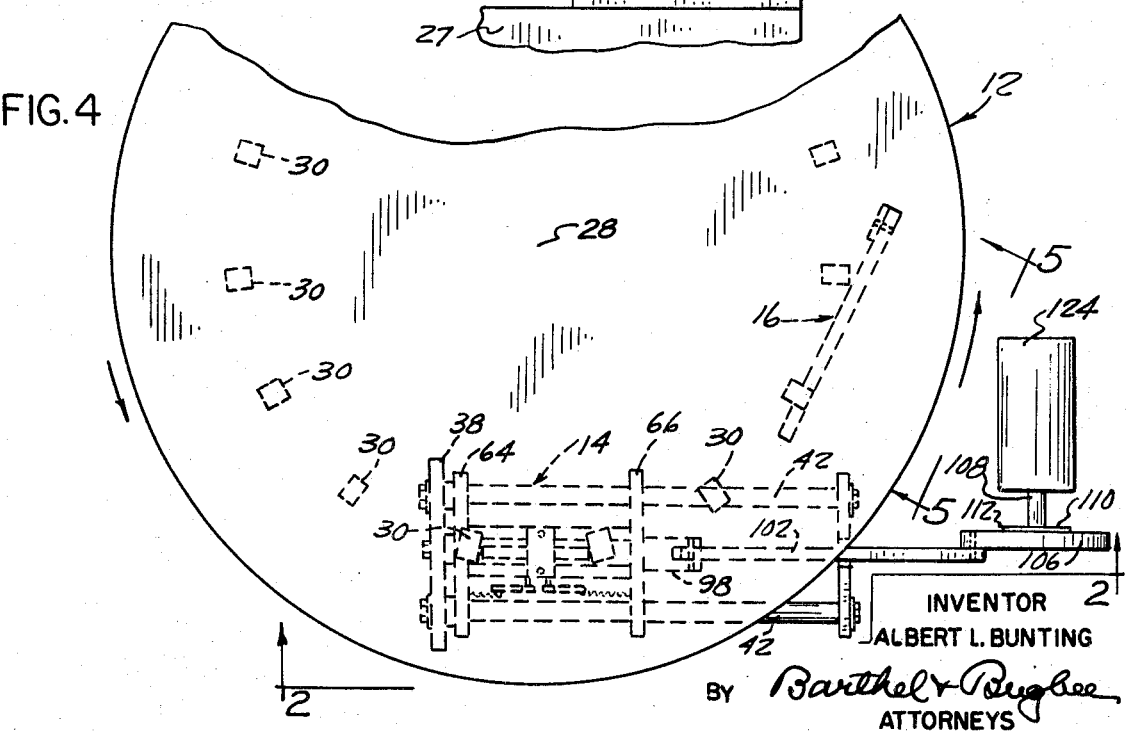
INVENTOR
ALBERT L. BUNTING
BY Barthel & Bugbee
ATTORNEYS

United States Patent Office 3,541,645
Patented Nov. 24, 1970

3,541,645
AUTOMATIC ROTARY PLASTIC MOLDING MACHINE
Albert Lowell Bunting, 24627 Rockford Ave.,
Dearborn, Mich. 48124
Filed Oct. 30, 1967, Ser. No. 679,038
Int. Cl. B29c 3/00
U.S. Cl. 18—20                      9 Claims

ABSTRACT OF THE DISCLOSURE

This automatic rotary plastic molding machine has an endless conveyor in the form of a turntable which is rotated step-by-step intermittently by a motor-driven propelling device which also rotates a cam. This cam operates a switch which controls the halting of the turntable and the actuation of a locking brake, the opening of the mold mounted in circumferentially-spaced relationship around the periphery of the turntable for removal of the molded workpieces for the filling of the molds with expansible plastic granules, and the closing of the filled molds. Steam is supplied to the closed molds through valves which are automatically opened and closed during a portion of the rotation of the turntable, in order to supply the necessary heat for expanding the plastic beads which contain an expanding agent, such as pentane. Cooling water is sprayed against the molds at another portion of the cycle immediately following the shutoff of the steam and immediately prior to the automatic opening of the molds. These molds are preferably opened, filled and closed in pairs for convenience of operation. The turntable propelling device moves the turntable in simple harmonic motion, thereby accelerating it from, and decelerating it to momentary points of rest without impact and momentarily locking the turntable at the rest points as the mechanism returns to initiate the next cycle of such motion.

In the drawings:

FIG. 1 is a top plan view of an automatic rotary plastic molding machine according to one form of the invention, with a part of the steam supply piping omitted and with certain superstructure and the mold-opening and cold-closing cylinders removed to simplify the showing and avoid concealment of the working parts beneath;

FIG. 2 is an enlarged fragmentary side elevation of the power-driven intermittent propelling device for the turntable, looking in the direction of the arrows 2—2 in FIG. 4;

FIG. 3 is a top plan view of the device of FIG. 2 with the turntable omitted;

FIG. 4 is a fragmentary top plan view, on a reduced scale, of the turntable driving and braking mechanism with the cam-operated control switch omitted, and with the turntable shown diagrammatically without the molds and other equipment carried thereby;

FIG. 5 is a fragmentary side elevation of the turntable braking device, looking in the direction of the arrows 5—5 in FIG. 4;

FIG. 6 is an enlarged fragmentary side elevation, partly in section, of one of the mold assemblies mounted on the turntable, with the mold closed and about to be opened by the mold-opening cylinder, for removal of the molded workpiece; and FIG. 7 is a view similar to FIG. 6 but with the mold opened, filled with expansible plastic beads, and about to be closed by the mold-closing cylinder.

Referring to the drawings in detail, FIG. 1 shows an automatic rotary plastic molding machine, generally designated 10, according to one form of the invention as including an endless turntable 12 propelled intermittently by a propelling device 14 (FIGS. 2, 3 and 4). The turntable 12 is locked during its halted time periods by a turntable braking or locking device 16 (FIG. 5) and carries mold assemblies 18 which are first opened by a mold opener 19, then unloaded and then refilled (FIG. 7) by a mold filler 20 (FIG. 1), after which the mold assemblies 18 are closed by a mold closer 21 (FIG. 7) and steam applied thereto from a steam supply system 22 (FIG. 1), after which the molds are spray-cooled by a mold cooling system 24.

The turntable 12 is rotatably supported on multiple bearing balls 26 (FIG. 1) disposed in and between the annularly-grooved turntable 12 and an annularly-grooved supporting base structure 27 resting upon the floor or other suitable foundation. The details of the rotary mount of the turntable are conventional and beyond the scope of the present invention. A somewhat similar mounting arrangement employing anti-friction rollers in annular roller paths is disclosed in my previous patent No. 3,015,132 issued Jan. 2, 1962 for Method of Molding Plastic Articles. In this previous patent, however, the turntable is rotated continuously rather than in an intermittent or "start-and-stop" cycle, as in the present invention. The turntable 12 is thus rotated intermittently around a central vertical axis 28 to move its mold assemblies 18 in an orbital path by circumferentially-spaced depending motive lugs 30 welded, bolted or otherwise secured thereto to the underside 32 thereof. The lugs 30 serve both for propelling the turntable 12 and for locking it temporarily in its halted position.

The turntable intermittent propelling device 14 (FIGS. 2, 3 and 4) is mounted in a position tangential to the circular path of the lugs 30 on structural supports 34 and 36 (FIG. 2). The propelling device 14 includes a guideway 37 consisting of a pair of spaced parallel vertical supporting plates 38 and 40 which are bored in parallel alignment to receive and hold a pair of laterally-spaced horizontal guide rods 42 (FIG. 3) and externally-threaded reduced-diameter ends held in place by nuts 44. Bolted as at 46 to the supporting plate 38 is a pivot yoke or bracket 48 (FIG. 2), the arms of which are drilled horizontally to receive a pivot bolt 50 pivotally supporting a vertically-swingable control arm 52. Pivoted as at 54 to the opposite end of the operating arm 52 is a yoke or cross head 56 mounted on the upper end of a piston 58, the head of which (not shown) is reciprocably mounted within a fluid pressure operating cylinder 60 bolted or otherwise secured in a vertical position to the structural support 36.

The control arm 52 regulates the action of an actuating carriage 62 (FIGS. 2 and 3) with respect to propelling engagement with and disengagement from the lugs 30, in the manner described below. The carriage 62 includes a pair of longitudinally-spaced parallel end plates 64 and 66 bored in alignment with the guide rods 42 in order to slide therealong. The end plates 64 and 66 (FIG. 3) are interconnected by laterally-spaced tie plates 68 and 70 having their opposite ends welded or otherwise secured thereto. Bolted to the top side of the tie plates 68 and 70 is a transverse stop plate 72.

Immediately below the stop plate 72, the tie plate 70 is drilled in spaced parallel relationship to pivotally receive two shafts 74 and 76. Clamped to the outer ends of the shafts 74 and 76 are operating arms 78 and 80 respectively urged to rotate in opposite directions by tension springs 82 and 84 resiliently connecting their lower ends to the end plates 64 and 66 respectively.

Mounted on and clamped to the shaft 74 between the tie plates 68 and 70 is an approximately Z-shaped lever or dog 86, the upper end 88 of which is adapted to be moved into and out of intercepting relationship with the lugs 30 in response to the rotation of the shaft 74 in opposite directions by the upward or downward swinging of the control arm 52 against the lower end 90 of the Z-lever 86. Mounted upon and clamped to the shaft 76, also between the tie plates 68 and 70, is a swinging pawl 92, the upper end 94 of which is adapted to engage the rearward sides of the lugs 30 to rotate the turntable 12 in the counterclockwise direction of the arrows (FIGS. 1, 2 and 4) around the central axis of rotation 28 in response to the travel of the carriage 62 from left to right. (FIGS. 2 and 3). In the reverse direction, while the control arm 52 has been raised by an upward stroke of the piston 58 to swing the Z-lever 86 counterclockwise to move its upper end 88 out of the path of the lugs 30, the upper side 96 rides under any lug 30 in its path while it swings clockwise around its shaft 76 as the carriage 62 moves back to its left-hand position shown in FIGS. 2 and 3. The spring 84 permits downward yielding of the pawl 92 in this manner.

Welded or otherwise secured to the forward or outer side of the end plate 66 and projecting forwardly in parallel relationship to the guide rods 42 is a yoke or cross head 98, the arms of which are drilled transversely to receive a pivot pin 100. The carriage 62 is reciprocated by a carriage reciprocator including a connecting rod 102 pivotally mounted on the pivot pin 100 and projecting forwardly therefrom, the opposite end of the rod 102 being drilled to receive a crank pin or bolt 104 (FIG. 2) secured at its opposite end to the forward side of a rotary crank disc 106. The rotary crank disc 106 is keyed or otherwise drivingly secured to a drive shaft 108. The supporting plate 40 is notched or slotted as at 109 to provide clearance for the vertical swinging of the connecting rod 102.

Also keyed or otherwise drivingly secured to the drive shaft 108 on the rearward side of the crank disc 106 is a timing device or sector cam 110 (FIGS. 2 and 4) having a peripheral cam surface 112. Mounted on the supporting structure (not shown) above the cam 110 is a control switch 114 preferably of the conventional microswitch type with a movable switch-operating plunger or pin 116 extending downwardly from the switch casing 118 and carrying on its lower end a pivot pin 120 upon which a cam follower roller 122 is rotatably mounted. The switch-operating pin 116 is urged downwardly by a spring (not shown) within the switch casing 118 to urge the cam follower 122 into engagement with the cam edge 112 of the cam 110. The control switch 114 operates to control the operation of the molding machine 10 in the manner described below. The drive shaft 108 constitute the output shaft of a combined electric motor and reduction gearset 124 which causes the input shaft 108 to rotate continuously at a reduced speed during the operation of the molding machine 10. The pivot pin 100 also serves as a protective shear pin.

The turntable braking or locking device 16, which momentarily indexes and holds the turntable 12 in its halted position (FIG. 5) and prevents overrunning thereof consists of a base plate 126 mounted on the supporting base 27 of the turntable 12 and having at one end an upstanding post 128 secured thereto and at its opposite end a fluid pressure braking cylinder 130 containing the piston head (not shown) of a reciprocable piston 132. Secured to the upper end of the piston 132 is a pusher plate 134 which engage the lower side of a brake bar 137 pivoted on a pivot pin 138 at the top of the post 128 for vertical swinging motion. The upper side of the brake bar 136 near the outer end thereof contains a tapered notch 138 adapted to snugly but releasably fit each of the lugs 30. FIG. 5 shows the braking device 60 in its turntable-locking position.

The mold assemblies 18 are arranged at circumferentially-spaced intervals around the periphery of the turntable 12 (FIG. 1). As actually constructed, the machine 10 possesses 48 such mold assemblies 18, but for purposes of simplification only one-half that number, namely 24, are shown in FIG. 1. All of the mold assemblies 18 and their operating motors are of identical construction hence a single description will suffice for all.

Each mold assembly 18 has a mold unit 140 (FIG. 6) including lower and upper mold components or mold halves 142 and 144 respectively which collectively define a mold cavity 146. The mold halves 142 and 144 are shown for purposes of illustration as hollow hemispheres for molding spherical articles such as balls or Christmas tree ornaments 145. The mold halves 142 and 144, however, are removable and interchangeable with other mold halves of different configuration forming mold units 140 with conical, bell-shaped, spindle-shaped, pear-shaped and other desired mold cavity shapes. The lower mold half 142 is fixed in position by being mounted upon a lower mold support or post 148 secured to and rising from a mounting member or collar 150 which in turn is welded or otherwise secured to the upper side 152 of the turntable 12.

The turntable 12 radially inward from the mounting member 150 (FIGS. 1, 6 and 7) is drilled at the corners of a square to receive four mounting bolts and spacers 154 which support an elevated platform 156 forming the base for a pivot bracket 158, the forward and rearward ends of which are yoked and drilled to receive radially-spaced pivot pins 160 and 162. The word "radially" is used with reference to the axis of rotation 28 of the turntable 12. Pivotally mounted on the outer pivot pin 160 is an arm 164, the upper end of which carries a head 166 mounted at an obtuse angle thereto. Secured to and extending downward from the head 166 is a tubular upper mold support or post 168, the lower end of which receives the boss 170 on the thus vertically-movable upper mold half 144. The upper tubular post 168 extends into and is bolted to the head 166 and communicates with a steam block 172 mounted on the upper side of the head 166 and supplied with steam through a flexible hose 174, the connections of which will be described below.

The arm 164 above the pivot pin 160 is drilled transversely to receive a pivot pin 176 on which is pivotally mounted the forward end of a link 178, the rearward end of which is connected to a pivot pin 180 mounted on a bent lever or bellcrank lever 182, the lower end of which is pivotally mounted on the rearward pivot pin 162 of the pivot bracket 158. The rearward end of the link 178 and the upper forward side of the pivot bracket 158 are provided with inclined mutually engageable toggle locking surfaces 184 and 186 respectively, which disengage (FIG. 7) and unlock when the bent lever 182 is swung clockwise around and upward over its pivot pin 162.

The outer end portion 188 of the bent lever 182 is engaged by the swinging pawl 190 of the mold opener 19, the upper end of which is pivoted at 192 to a cross head 194 (FIG. 6) which extends laterally over a pair of bent levers 182 so as to operate two mold assemblies 18 simultaneously. The cross head 194 is mounted on the forward end of a piston 196 having a piston head (not shown) reciprocable within a pressure fluid mold-opening cylinder 198. The cross head 194 on its forward side serves as a stop for the upper end of a flange 200 secured to and extending horizontally at right angles to the pawl 190 and swingable vertically into engageability with the forward side of the cross head 194. The pawl 190 and its flange 200 are capable of swinging into a horizontal position to move past the end 188 of the lever 182 during the forward stroke of the piston 194, as shown by the dotted lines in FIG. 6. The cylinder 198 and a similar cylinder 202 of the mold closer 21 with a piston 204 and cross head 206 for afterward closing the molds 140 are mounted on the superstructure (not shown) located above the central portion of the turntable 12 in circumferentially-spaced positions on opposite sides of the feeder 24. When the upper end portion 188 of each bent lever 182 is swung into its rearward and downward position to open the mold halves 142 and 144 (FIG. 7), it comes to rest near the inclined top end 203 of a stop post 205, the lower end of which is threaded into the suitably drilled and threaded turntable 12. The upper ends 188 of the bent levers 182 are held down while the molds 140 are open, by an arcuate stationary cam 207 depending from and secured to the superstructure (not shown). The pawl 190 and cross head 194 are sufficiently short, in a vertical direction, to enable the lower end of the pwal 190 to slide over the upper end 188 of the bent lever 182 and drop behind it in the rear-most position of the cross head 194, ready to advance in a moldclosing strope during the next cycle of operation.

In the steam supply system 22, steam is supplied to the hoses 174 of the steam blocks 172 in the mold assemblies 18 from arcuate manifolds 208 (FIG. 1) which in turn are connected by radial steam supply pipes 210 containing rotary steam supply control valves 212 operated by stop pins or rods 214 and 216 acting upon star-wheel valve-operating members 218. The stop rods 214 and 216 are secured to and depend from the stationary superstructure (not shown) located above the turntable 12 and its mold assemblies 18. Each manifold 208 serves four steam blocks 172. The inner ends of the steam supply pipes 210 are connected to a steam accumulator or surge tank 220 which makes steam at a suitable pressure always available without requiring the use of higher pressure steam to obtain fast enough flow through the steam supply system 22 into the mold cavities 146.

The granulated plastic filler 20 (FIG. 1) which supplies the polystyrene granules or beads to fill the lower mold halves 142 is conventional, hence is shown only diagrammatically in FIG. 1. It includes an overhead hopper (not shown) from which a pair of plastic supply pipes 222 extend downward to the forward end of a filler housing 224 in which a filler slide 226 is reciprocated in order to open and close ports 228 located at the lower ends of the pipes 222 and meter out predetermined quantities 225 of polystyrene beads for each filling of each mold cavity 146. The feeder slide 226 is pivoted at 230 to the forward end of a piston 232, the readward end of which carries a piston head (not shown) reciprocable in a pressure fluid cylinder 234.

The mold cooling system 24 consists principally of an arcuate pipe 236 (FIG. 1) the periphery of which is provided with multiple spaced spray nozzles 238 to project a water spray upwardly against the lower mold halves 142 in the closed positions of the molds 140 immediately after the stop rod 216 has shut off the steam thereto by rotating the star wheel valve-operating members 218. The water spray from the spray nozzle 238 of the spray pipe 236 operates continuously. The pipe 236 is connected to a suitable source of cooling water, such as to a water pipe leading to a city water main (not shown).

The fluid pressure cylinder 60, 130, 198, and 234 are connected by way of piping containing solenoidal valves (not shown) to a source of compressed air at a suitable pressure, say 80 pounds per square inch. These solenoidal valves are actuated by the control switch 114 (FIG. 2) which in turn is actuated by the cam edge 112 of the cam 110 as the shaft 108 rotates.

In the operation of the automatic rotary plastic molding machine 10, let it be assumed that the plastic bead supply hopper (not shown) has been filled with polystyrene plastic beads which, to prevent premature fusion, have been coated with a film of zinc stearate in the manner described in my above-mentioned U.S. Pat. No. 3,015,132 of Jan. 2, 1962. When the motor-driven reduction gear set 124 is started in operation, the consequent continuous rotation of its output shaft 108 (FIG. 4), crank disc 106 and cam 110 in a clockwise direction (FIG. 2) causes the connecting rod 102 to pull the carriage 62 from its left-hand or retracted position of FIG. 2 to the right along the guide rods 42 to cause the pawl 92 to rotate the turntable 12 through a fixed angle determined by the stroke of the carriage 62, assisted by the wedging action of the Z-lever 86. When the carriage 62 has thus reached its extreme forward position (to the right in (FIG. 2) and has returned to its retracted or halt position shown in FIG. 2, the circuit through the microswitch 114 is closed by the action of the cam edge 112 pushing upward on the switch-operating plunger 116. This action closes the circuit to the solenoidal wave (not shown) supplying compressed air to the cylinder 60 to move the control arm 52 upward to withdraw the Z-lever from the path of the lugs 30. It also closes the circuit to the solenoidal valve (not shown) supplying compressed air to the cylinder 130 (FIG. 5), causing its breake bar 136 to move its notch 138 upward into the turntable lug 30 momentarily aligned therewith, locking the turntable 12 temporarily in its attained halted position.

At the same time, the closing of the switch 114 opens the valve supplying compressed air to the forward end of the mold-opening cylinder 198, causing its cross head 194 and piston 196, then in the forward position of FIG. 6, to move rearwardly so that the pawl 190 pulls the outer end 188 to be swung clockwise around its pivot pin 162 into an almost horizontal position near the stop post 204. The cross head 194 continues to move rearwardly beyond the ends 188 of the pair of the bent levers 182, sliding over them and causing their pawls 190 to come to rest behind it to the right of the lever 182. This action causes the links 78 to swing their arms 164 rearwardly (clockwise) around their pivot pins 160, carrying with them their heads 166, steam blocks 172 and upper mold halves 142 from their closed positions of FIG. 7 to their open positions of FIG. 6. Upon the next rearward strokes of the carriage 62 to propel the turntable 12 another step, the ends 188 of the bent levers 182 of the pair of thus-opened mold assemblies 18 move beneath the stationary arcuate hold-down cam 207 (FIG. 7) which subsequently holds them in their open position during approximately one-third of the revolution of the turntable 12, until they arrive adjacent the cross head 206 of the mold-closing cylinder 202, where the arcuate holddown cam terminates.

Meanwhile, a previously-opened pair of mold assemblies 18 have arrived beneath the forward end of the filler housing 224, and the closing by the cam 110 of the microswitch 114 mentioned above has energized the solenoidal valve (not shown) supplying compressed air to the cylinder 234 to move its piston 232 and filler slide 226 forward toward the turntable 12 to drop a metered charge 225 of polystyrene plastic beads through the supply pipes 222 into the lower mold halves 142 beneath them. While this action has been taking place, the mold assemblies 18 beyond the filler 20 in a counterclockwise direction have been closed by the actuation of the solenoidal valve (not shown) admitting air to the rearward (right-hand) end of the mold-closing cylinder 202 (FIG. 7) to move the piston 204 and cross head 206 forward to push and cam the end 188 of the bent lever 182 upward counterclockwise around its pivot 162 to swing the arm 164 and upper mold half 144 downward upon the lower mold half 142, where the over-center toggle action of the locking surfaces 184 locks them firmly together. Thereafter, the encounter of their star wheel valve-operating member 218 with the depending stop rod 214 has rotated the former to open the respective steam control valve 212 to permit steam to pass from the steam accumulator 220 through the respective steam supply pipe 210 to the particular arcuate manifold 208, whence the steam flows through the hoses 174 to the now closed mold units 142 supplied by them (FIG. 1). The steam blast or jet entering each mold cavity 146 thereof tumbles the zinc-stearate-coated polystyrene plastic beads therein, causing them to expand as a result of the head reacting on the pentane or other expanding agent contained within the beads. As a result, the beads expand to fill their respective mold cavities 146 and fuse together in due course, premature fusing being prevented by the zinc-stearate coatings of the beads.

When the turntable is next advanced by the subsequent action of the carriage 62 (FIGS. 2 and 3), the star wheel wheel valve-opearting member 218 which has been previously rotated to the open position of the steam valve 212 by engagement with the stop rod 214, now similarly encounters the depending stop rod 216 (FIG. 1) which rotates it to close valve 212 and shut off the supply of steam. Immediately beyond this point, the mold units 140 containing the now expanded and fused plastic beads are subjected to the cooling water spray from the spray nozzles 238 of the cooling water pipe 236 until they arrive at the mold-opening station where they are subjected to the action of the cross head 194 by the cylinder 198 to move the upper mold halves 144 from their closed positions of FIG. 7 to their open positions of FIG. 6. The operator then removes the completed molded articles 145 from the now-open mold units 140, whereupon the now empty lower mold halves 142 are ready to be refilled with plastic beads from the filler 20 as the turntable 12 continues to be rotated step-by-step, two mold assemblies 18 at a time, by the reciprocation of the carriage 62 in response to the rotation of the crank disc 106 and the reciprocation of the connecting rod 102 (FIG. 2).

In this manner each pair of mold assemblies 18 travels intermittently step-by-step past a series of stations during a complete cycle of operation, these stations being arranged at successive locations around the base structure 27 outside and immediately adjacent the periphery of the turntable or endless conveyor 12. In particular, a mold-opening station 240 is located adjacent the mold opening cylinder 198, and a mold unloading station 242 is located between the mold opening station 240 and a mold filling station 244 immediately adjacent the feeder 20. A mold closing station 246 is located adjacent the mold closing cylinder 202. A mold heating station 248 extends between the mold closing station 246 and a heat shutoff station 250, and a mold cooling station 252 extends the length of the arcuate spray pipe 236 back to the mold opening station 240, completing the cycle of operation.

Thus, the control switch 114 is closed by the cam 110 only when the turntable 12 is halted and maintained at a standstill by the action of the braking or locking device 16 (FIG. 5), and the carriage 62 is momentarily prevented from advancing the turntable 12 by the withdrawal of the end 88 of the Z–lever 90 from the path of travel of the lugs 30 of the turntable 12 in response to the upward swinging of the operating arm 52 by the piston 58 of the cylinder 60. As a consequence, the above-described opening of the mold units 140 by the cross head 194 of the cylinder 198, the filling action of the filling 20, and the subsequent closing of the mold units 140 take place only when the turntable 12 is momentarily halted.

During the retraction stroke of the carriage 62 by the rotation of the crank disc 106 and the reciprocation of the connecting rod 102, the upper end 94 of the pawl 92 is pushed downward by its encounter with the turntable lug 30 and passes beneath the latter as the arm 80 swings clockwise around the pivot 76 under the yielding action of the spring 84. In a similar manner, when the cross head 194 advances from its retracted position behind the ends 188 of the bent levers 182 in their rearwardly-swung positions (FIG. 6), its pawl 190 and stop flange 202 swing upward around the pivot pin 192 in a counterclockwise direction into the dotted line position of FIG. 7 and thus pass over the ends 188 of the bent levers 182 in either their lowered or rearward positions (FIG. 6) or their raised or forward positions (FIG. 7).

It will be seen from the foregoing description and from FIGS. 2 and 4 of the drawings that the turntable propelling device 14 moves the turntable 12 in simple harmonic motion. This has been defined in Webster's New International Dictionary, Second Edition, Unabridged by G & C Merriam Co., Springfield, Mass. as "the projection of uniform circular motion on any diameter of the circle in which the motion occurs." It achieves the advantage of accelerating the turntable from one point of rest and decelerating it to another point of rest without jolting or impact at either point of rest. The turntable is locked at each of these points of rest while the mechanism of the propelling device 14 returns to initiate the next cycle of motion of the turntable.

It will be evident to those skilled in the art that the molded articles may be ejected by compressed air, but practice has demonstrated that if this is done, a secondary inspection is necessary for each piece. On the other hand, when the operator removes them manually, he inspects each piece at that time and makes any minor adjustments, as to steam pressure, variation in time and so forth at that moment so that no great accumulation of scrap results.

The locking lever 86 and pawl 92 (FIG. 2) operate: (1) to accelerate the table for the first ninety degrees of motion to the maximum velocity, and (2) to decelerate the table to zero velocity from 90 degrees to 180 degrees (degrees on the eccentric). In this way, no severe braking occurs and when the table 12 reaches the zero point of motion, the lever 86 locks and holds the table. In this position, the pawl 92 is returned to the new position ready to advance the table 12 again from zero velocity to maximum speed and then to zero for the next cycle. The table 12 moves only during 180 degrees of rotation of the rotary crank disc 106. During the second 180 degrees of rotation of the crank disc 106, the pawl 92 returns to its starting position while the table 12 is held stationary by the locking lever 86, at which time all operations take place, except for the steaming of the molds created by the motion of the table itself, namely the opening of the molds, the unloading of the molds, the filling of the molds, and the closing of the molds.

It will be understood that in some instances a variable length of time is provided between the time that the supply of steam to the molds is shut off and the time that the cooling of the molds is started. This is to take care of special cases where some degree of cure has to develop, whereby the expanding plastic material will continue to fill out the mold more completely before it is cooled. This is a variable factor which can be accomplished by adjustments in the machine 10 and the machine is so designed to enable this to be done.

Thus, it will be seen that the present machine possesses the great advantage that any one mold may be removed and another mold of another shape installed in its place, which gives versatility and flexibility thereto. In the operation of a machine constructed in accordance with this invention, as many as six different workpieces 145 have been molded on the same machine. Moreover, due to the manner of mounting the molds 140, they may be changed in a matter of a few minutes. In such cases, where the amount of plastic required for the unusual workpiece differs from that which is fed by the filler 20, the filler is caused to skip that mold, whereupon the skipped mold is either hand-filled or filled from another filler with the correct amount of plastic required to make the unusual workpiece.

I claim:
1. An automatic rotary plastic molding machine, comprising:
   a base structure having disposed in succession therearound a mold opening station, a mold filling station, a mold closing station, a mold heating station and a mold cooling station,
   an endless conveyor mounted on said base for travel in a generally horizontal orbital path past said stations,
   a multiplicity of mold assemblies mounted in circumferentially-spaced relationship on said conveyor for travel therewith along said orbital path,
     each of said mold assemblies including a pair of separate mold components defining a mold cavity therebetween with one mold component movable toward and away from the other mold component into closed and open positions respectively, motive members connected to said conveyor at intervals therealong, power-driven simple-harmonic-motion propelling means engageable successively with said motive members for respectively moving and halting said conveyor intermittently step-by-step in said orbital path, means for supplying a heating medium and a cooling medium to said mold components at said heating and cooling stations respectively, a mold opener disposed at said mold opening station, a mold filler disposed at said mold filling station, a mold closer disposed at said mold closing station, and timing means operable upon the halting of said conveyor for energizing said mold opener, said mold filler and said mold closer, and conveyor locking means operatively engageable with said motive members for locking said conveyor in its halted position in response to the halting thereof and for releasing said conveyor prior to resumption of travel thereof, said locking means including a locking member selectively movable into and out of locking engagement with said motive members and a power-operated device for so moving said locking member.

2. An automatic rotary plastic molding machine, comprising:

a base structure having disposed in succession therearound a mold opening station, a mold filling station, a mold closing station, a mold heating station and a mold cooling station;

an endless conveyor mounted on said base for travel in a generally horizontal orbital path past said stations, a multiplicity of mold assemblies mounted in circumferentially-spaced relationship on said conveyor for travel therewith along said orbital path, each of said mold assemblies including a pair of separate mold components defining a mold cavity therebetween with one mold component movable toward and away from the other mold component into closed and open positions respectively, motive members connected to said conveyor at intervals therealong, power-driven simple-harmonic-motion propelling means engagable successively with said motive members for respectively moving and halting said conveyor intermittently step-by-step in said orbital path, means for supplying a heating medium and a cooling medium to said mold components at said heating and cooling station respectively, a mold opener disposed at said mold opening station, a mold filler disposed at said mold filling station, a mold closer disposed at said mold closing station, and timing means operable upon the halting of said conveyor for enregizing said mold opener, said mold filler and said mold closer, said propelling means including a guideway, a carriage reciprocable along said guideway, a motive-member-intercepting device mounted on said carriage for travel therewith, a carriage reciprocator operatively connected to said carriage for moving said carriage in simple harmonic motion, and a prime mover drivingly connected to said reciprocator.

3. An automatic rotary plastic molding machine, according to claim 2, wherein intercepting-device-releasing means is disposed adjacent said intercepting device and is responsive to the arrival of said carriage at a predetermined location for disengaging said intercepting device from said motive members whereby to halt said conveyor.

4. An automatic rotary plastic molding machine, comprising:

a base structure having disposed in succession therearound a mold opening station, a mold filling station, a mold heating station and a mold cooling station;

an endless conveyor mounted on said base for travel in a generally-horizontal orbital path past said stations, a multiplicity of mold assemblies mounted in circumferentially-spaced relationship on said conveyor for travel therewith along said orbital path, each of said mold assemblies including a pair of separable mold components defining a mold cavity therebetween with one mold component movable toward and away from the other mold component into closed and open positions respectively, power-driven propelling means for respectively moving and halting said conveyor step-to-step in said orbital path, means for supplying a heating medium and a cooling medium to said mold components at said heating and cooling stations respectively, a mold opener disposed at said mold opening station, a mold filler disposed at said mold filling station, a mold closer disposed at said mold closing station, and timing means operable upon the halting of said conveyor for energizing said mold opener, said mold filler and said mold closer, said propelling means including a guideway, a carriage reciprocable along said guideway, motive members connected to said conveyor at intervals therealong, a motive-member-intercepting device mounted on said carriage for travel therewith, a carriage reciprocator operatively connected to said carriage, and a prime mover drivingly connected to said reciprocator, said mold opener and mold closer including pressure fluid operating cylinders therefor, and said timing means including a cam operatively connected to said prime mover for movement thereby, a control switch operatively engaged by said cam, an electrical control circuit connected to said switch in controlled relationship therewith, and pressure fluid supply means controlled by said control circuit and connected to said cylinder.

5. An automatic rotary plastic molding machine, comprising:

a base structure having disposed in succession therearound a mold opening station, a mold filling station, a mold closing station, a mold heating station, and a mold cooling station;

an endless conveyor mounted on said base for travel in a generally horizontal orbital path past said stations, a multiplicity of mold assemblies mounted in circumferentially-spaced relationship on said conveyor for travel therewith along said orbital path, each of said mold assemblies including a pair of separate mold components defining a mold cavity therebetween with one mold component movable toward and away from the other mold component into closed and open positions respectively, motive members connected to said conveyor at intervals therealong, power-driven simple-harmonic-motion propelling means engageable successively with said motive members for respectively moving and halting said conveyor intermittently step-by-step in said orbital path, means for supplying a heating medium and a cooling medium to said mold components at said heating and cooling stations respectively, a mold opener disposed at said mold opening station,
a mold filler disposed at said mold filling station,
a mold closer disposed at said mold closing station,
and timing means operable upon the halting of said conveyor for energizing said mold opener, said mold filler and said mold closer,
 each mold assembly having a movable mold-supporting member pivotally mounted therein and carrying the movable mold component and also having a swinging lever operatively engageable with said movable member,
 said mold opener including a reciprocable fluid pressure motor operatively connected to said lever, and
 said mold closer also including a reciprocable fluid pressure motor operatively engageable with said lever.

6. An automatic rotary plastic molding machine, according to claim 5, wherein said mold opener includes a cross head operatively connected to said motor and spanning a plurality of said levers.

7. An automatic rotary plastic molding machine, comprising:
 a base structure having disposed in succession therearound a mold opening station, a mold filling station, a mold closing station, a mold heating station and a mold cooling station;
 an endless conveyor mounted on said base for travel in a generally-horizontal orbital path past said stations,
 a multiplicity of mold assemblies mounted in circumferentially-spaced relationship on said conveyor for travel therewith along said orbital path,
  each of said mold assemblies includes a pair of separable mold components defining a mold cavity therebetween with one mold component movable toward and away from the other mold component into closed and open positions respectively,
 power-driven propelling means for respectively moving and halting said conveyor step-by-step in said orbital path,
 means for supplying a heating medium and a cooling medium to said mold components at said heating and cooling stations respectively,
 a mold opener disposed at said mold opening station,
 a mold filler disposed at said mold filling station,
 a mold closer disposed at said mold closing station,
 and timing means operable upon the halting of said conveyor for energizing said mold opener, said mold filler and said mold closer,
  each mold assembly having a movable mold-supporting member pivotally mounted therein and carrying the movable mold component and also having a swinging lever operatively engageable with said movable member,
  said mold opener including a reciprocable fluid pressure motor operatively connected to said lever, and said mold opener also including a cross head operatively connected to said motor and spanning a plurality of said levers,
  said cross head having a stop thereon and carrying a pawl element pivotally connected thereto and movable into abutting engagement with said stop and into operative engagement with said lever in the mold-opening direction of motion of said cross head and swinging freely past said lever in the retraction direction of said cross head.

8. An automatic rotary plastic molding machine, according to claim 5, wherein said lever is a bent lever, wherein a link with a locking surface thereon connects said lever to said movable mold supporting member, and wherein said mold assembly has a stationary locking abutment engageable with said locking surface.

9. An automatic rotary plastic molding machine, comprising:
 a base structure having disposed in succession therearound a mold opening station, a mold filling station, a mold closing station, a mold heating station, and a mold cooling station;
 an endless conveyor mounted on said base for travel in a generally horizontal orbital path past said stations,
 a multiplicity of mold assemblies mounted in circumferentially-spaced relationship on said conveyor for travel therewith along said orbital path,
  each of said mold assemblies including a pair of separable mold components defining a mold cavity therebetween with one mold component movable toward and away from the other mold component into closed and open positions respectively,
 motive members connected to said conveyor at intervals therealong,
 power-driven simple-harmonic-motion propelling means engageable successively with said motive members for respectively moving and halting said conveyor intermittently step-by-step in said orbital path,
 means for supplying a heating medium and a cooling medium to said mold components at said heating and cooling station respectively,
 a mold opener disposed at said mold opening station,
 a mold filler disposed at said mold filling station,
 a mold closer disposed at said mold closing station,
 and timing means operable upon the halting of said conveyor for energizing said mold opener, said mold filler and said mold closer,
  said heat-supplying means including heating fluid conduits connected to one of said mold components of each mold assembly and adapted to be connected to a source of heating fluid, and also including rotary valve means connected in fluid-controlling relationship with said conduits further including valve-opening and valve-closing elements disposed in spaced relationship along said orbital path in said mold-heating station and operatively engageable with said rotary valve means to open and close the same respectively at such spaced locations in said orbital path,
  said rotary valve means including valves each of which has a rotary valve member and a star wheel member operatively connected thereto and disposed in intercepting relationship with said valve-opening and valve-closing elements.

References Cited

UNITED STATES PATENTS

| | | | |
|---|---|---|---|
| 1,536,107 | 5/1925 | Klin. | |
| 2,117,400 | 5/1938 | Cobb. | |
| 3,015,132 | 1/1962 | Bunting | 264—51 |
| 3,419,648 | 12/1968 | Leach | 264—53 |

H. A. KILBY, JR., Primary Examiner

U.S. Cl. X.R.

18—5